United States Patent [19]
Wetmore et al.

[11] Patent Number: 5,529,594
[45] Date of Patent: Jun. 25, 1996

[54] METHOD FOR PRODUCING MINERAL FIBERS HAVING GASEOUS OCCLUSIONS

[75] Inventors: Kenneth H. Wetmore, Perrysburg; Ray S. Richards, Toledo, both of Ohio

[73] Assignee: Stir-Melter, Inc., Perrysburg, Ohio

[21] Appl. No.: 234,685

[22] Filed: Apr. 28, 1994

[51] Int. Cl.⁶ .......................... C03B 5/18; C03B 37/022
[52] U.S. Cl. .................. 65/376; 65/482; 65/22; 65/439; 65/474; 65/135.3
[58] Field of Search .............. 65/473, 482, 376, 65/22, 439, 474, 135.3, 377

[56] References Cited

U.S. PATENT DOCUMENTS

| | | | |
|---|---|---|---|
| 2,261,022 | 10/1941 | Fox | 65/22 |
| 2,936,479 | 5/1960 | Morrison | 18/2.5 |
| 2,980,954 | 4/1961 | Levecque et al. | 18/2.6 |
| 3,238,029 | 3/1966 | Cullen | 65/15 |
| 3,250,602 | 5/1966 | Stalego | 65/8 |
| 3,393,986 | 7/1968 | Firnhaber | 65/15 |
| 3,596,319 | 8/1971 | McKenica | 65/22 |
| 3,622,293 | 11/1971 | Firnhaber | 65/14 |
| 3,628,937 | 12/1971 | Schott | 65/22 |
| 3,929,440 | 12/1975 | Oldfield | 65/134.5 |
| 3,951,635 | 4/1976 | Rough, Sr. | 65/135 |
| 4,078,909 | 3/1978 | Dietzsch et al. | 65/2 |
| 4,270,943 | 6/1981 | Riddell et al. | 65/15 |
| 4,309,204 | 1/1982 | Brooks | 65/474 |
| 4,361,624 | 11/1982 | Spivack | 428/398 |
| 4,432,780 | 2/1984 | Propster | 65/482 |
| 4,511,383 | 4/1985 | Bhatti | 65/6 |
| 4,526,597 | 7/1985 | Olinger et al. | 65/1 |
| 5,100,453 | 3/1992 | Richards | 65/27 |
| 5,352,258 | 10/1994 | DeGreve | 65/27 |
| 5,364,426 | 11/1994 | Richards | 65/474 |

*Primary Examiner*—John M. Hoffmann
*Attorney, Agent, or Firm*—Brooks & Kushman

[57] ABSTRACT

The mineral fiber forming apparatus having electrodes for heating heat softenable mineral material to form a molten mineral mass is disclosed. Organically-coated glass fiber scrap and cullet are supplied to the vessel providing the heat softenable mineral material. An impeller turbulently mixes the molten mineral mass dispersing batch into the molten mineral mass and converting water in the molten mineral bath to steam. Molten mineral material formed by the apparatus includes small seeds and gaseous occlusions. The molten mineral material is fed from an outlet port in the vessel to a rotary spinner which forms hollow mineral fibers having gaseous occlusions of between 1% and 10% by volume by centrifuging the molten mineral material through a rotary bushing.

8 Claims, 3 Drawing Sheets

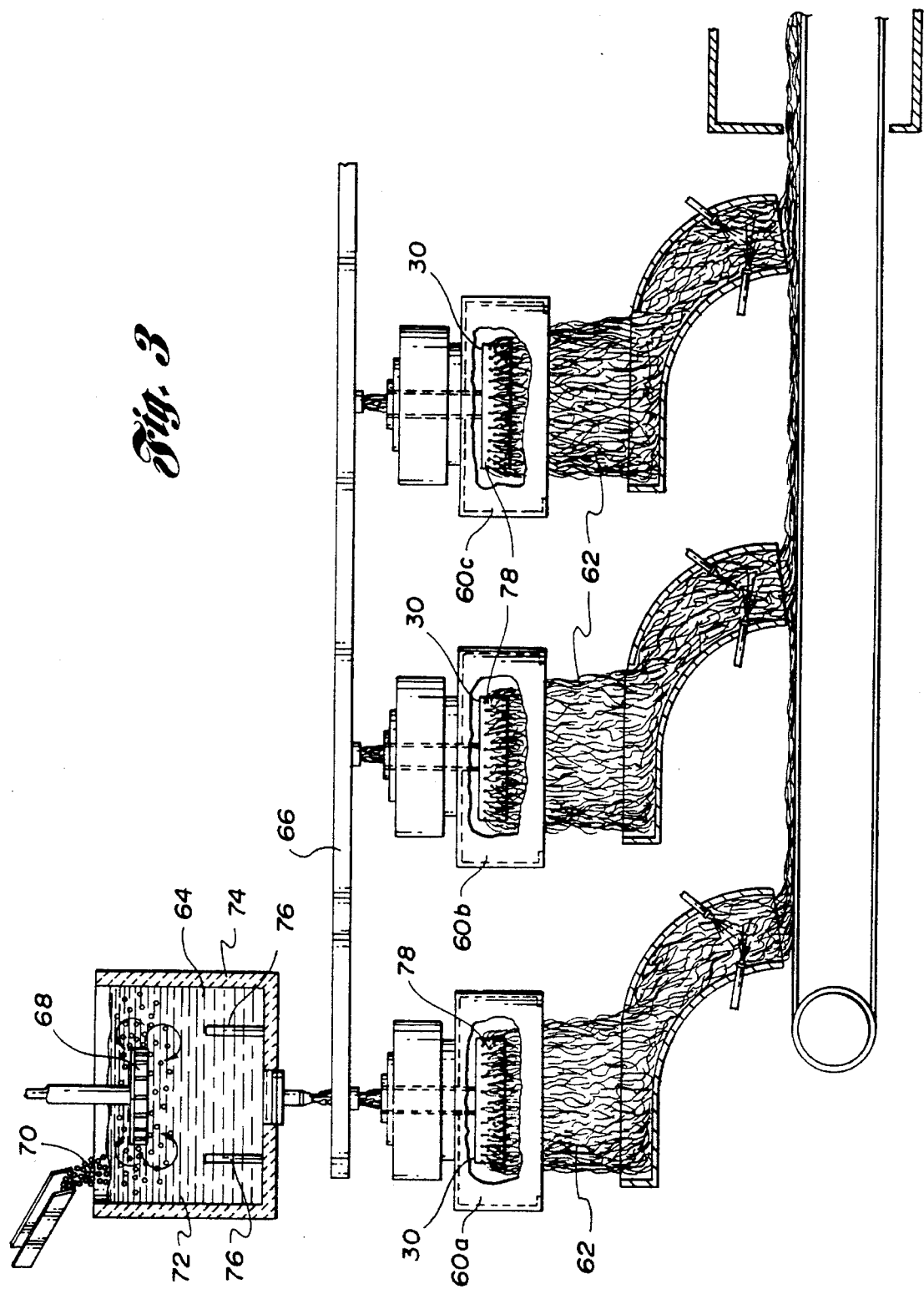

METHOD FOR PRODUCING MINERAL FIBERS HAVING GASEOUS OCCLUSIONS

TECHNICAL FIELD

This invention relates to a method and apparatus for making mineral fibers having gaseous occlusions.

BACKGROUND OF INVENTION

Methods and apparatus for producing mineral fibers such as glass fibers generally include a first step of melting mineral material in a large gas-fired and electrically heated tank. Smaller melters having dual heating elements are also used and generally include a cold top batch blanket. Electric melters having cold top batch blankets generally have a short life due to thermal stress and consumption of electrodes by corrosive elements of the molten mineral bath.

The manufacture of mineral fibers by a rotary fiberizing method is well known as exemplified by the disclosure of U.S. Pat. No. 4,511,383 to Bhatti.

It has been proposed to manufacture fibers with gaseous occlusions in several prior art patents. For example, U.S Pat. No. 4,526,597 to Olinger et al, a method and apparatus for forming fibers, including a rotary spinner having a porous member positioned adjacent fiber forming ports is disclosed. Gas is supplied under pressure during the fiber forming operation to cause the introduction of gas into the molten mineral material. One of the stated purposes of this method is to provide means for adding a last minute chemical additive treatment or to control the turbulent fiberizing environment. Another stated purpose is to permit the manufacture of hollow or partially hollow fibers thereby enabling weight reduction and potentially improving the thermal resistance of insulation products. The proposal disclosed in Olinger required costly modifications of the fiberizing spinner.

When stir-melting was initially developed, it was with a view to manufacturing quality glass having a minimum number of gaseous occlusions and seeds. In fact, considerable developments were directed to elimination of gaseous occlusions and seeds as disclosed in U.S. Pat. No. 3,951,635 to Rough. In that patent, it was proposed to use a centrifuge to eliminate seeds and gaseous occlusions in the molten mineral material. Seeds are considered to be undesirable in the prior glass processing techniques because they reduce optical clarity.

It has long been an object in the mineral fiberizing field to provide a rapid and flexible method of producing molten glass fibers. Rapid glass melting can result in considerable energy savings. Large, static glass tanks used in fiberglass production are generally maintained at elevated temperatures continuously due to the long period of time required for melting glass batch. In addition, repeated heating and cooling of glass melters creates stress and wear, which reduce the effective life of the equipment.

DISCLOSURE OF INVENTION

It is an object of the invention to provide a primary melter for mineral fiber production wherein high-speed stirring in a Joule heated tank results in high throughput of molten mineral material. High-speed stirring necessarily results in the development of a large number of gaseous occlusions in the melted mineral material. Gaseous occlusions result from the turbulent mixing of air and also from the formation of steam when water in the mineral batch is converted into steam. Alternatively, gaseous occlusions may be created by injecting other gases or gasifying products such as carbonates, sulfur-dioxide, helium, nitrogen, or argon.

It is another object of the present invention to provide a method of making glass fibers from glass-making materials melted in a vessel which can include, in part, recycled organically-bound glass fiber scrap. An impeller mixes the glass bath and gases to form melted glass having gaseous occlusions of up to 50% by volume. The occluded melted glass is then supplied to a glass fiber forming process to form glass fibers having gaseous occlusions of between 1% and 10% by volume.

It is a further object of this invention to provide a high-production fiberglass melter wherein the benefits of providing a glass fiber including gaseous occlusions is achieved without the need for expensive techniques for introducing gases. In this way, a highly efficient mineral melting technique can be used to directly supply melted mineral material, including gaseous occlusions without post-melting processing steps.

These and other objects are provided by the invention as summarized below.

The present invention relates to a method and apparatus for making mineral fibers of heat-softenable mineral material at a high rate of throughput wherein the heat-softenable material is turbulently stirred during a melting step to form a molten mineral mass. Additional heat-softenable material is fed on top of the molten mineral mass while a portion of the molten mineral mass is removed from the vessel and supplied to a fiberizing process which fiberizes molten mineral material after removal from the vessel.

According to one aspect of the method, glass batch, including water, is supplied to the vessel with water being converted to steam in an upper region of the vessel. Electrical energy for Joule heating is supplied to the vessel by means of electrodes wherein current is passed through the molten mineral mass. The electrodes are located in a lower portion of the vessel to minimize exposure of the electrodes to steam in the molten mineral mass. An impeller located in the upper portion of the vessel stirs the molten mineral mass and glass batch material added to the bath to mix them and form a dispersion.

The molten mineral mass includes a large quantity of minuscule gaseous occlusions as it is fed from the melter to the fiberizing bushing. The fiberizing bushing is preferably a rotary fiberizing bushing which centrifuges the molten mineral mass through small orifices in the bushing. The molten mineral mass is extruded through the orifices and formed into mineral fibers as it is cooled after exiting the bushing. The melter preferably feeds molten mineral material into a channel which supplies molten mineral material to a plurality of rotary fiberizing bushings.

The impeller is preferably a steel impeller provided with a water-cooling system which operates with a coating of solidified molten mineral material on its surface which protects the surface from corrosion and wear.

The apparatus of the present invention includes a vessel including electrodes for Joule heating and an impeller for stirring heat-softenable material to form a molten mineral mass. The outlet port of the vessel is in fluid flow communication with a rotary fiberizing bushing. The rotary fiberizing bushing acts upon molten mineral material including gaseous occlusions as received from the vessel and forms hollow mineral fibers.

The apparatus also includes a water-cooled impeller which is protected by a coating of solidified molten mineral material. The impeller is isolated from electrical conduction by means of the solidified mineral material layer which also protects the impeller from corrosion and wear. The electrodes in the vessel are preferably disposed in the lower portion of the vessel so that they are not directly exposed to steam or other corrosive gases in the melt. Alternatively, the electrodes may be formed of platinum or other another material which is not subject to attack by water or steam in the molten mineral mass. The electrode may also be protected by using inert or reducing gases to form the bubbles.

These and other aspects of the invention are achieved in accordance with the invention and will be more fully understood in view of the attached drawings and following the description of the best mode for carrying out the invention.

BRIEF DESCRIPTION OF THE DRAWINGS

FIG. 3 is a schematic view of an alternative embodiment of the apparatus used to form mineral fibers according to the present invention.

BEST MODE OF CARRYING OUT THE INVENTION

Figure 1:
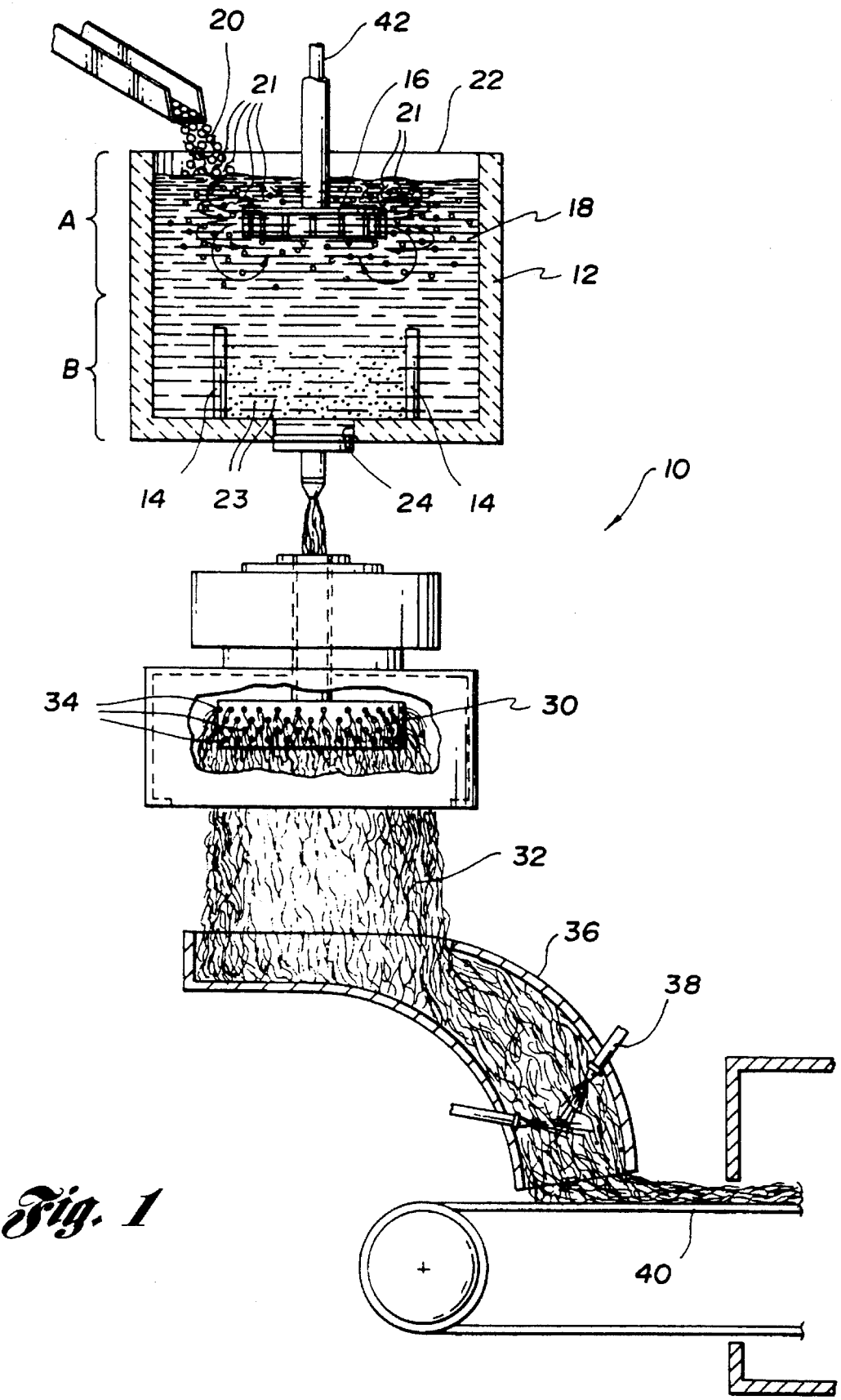
FIG. 1 is a schematic view of the apparatus used to form mineral fibers according to the present invention.

Referring to FIG. 1, a mineral fiber-forming apparatus is generally indicated by reference numeral 10. A vessel 12 having electrodes 14 and an impeller 16 is provided for melting and containing a molten mineral mass 18. Batch 20 including heat-softenable mineral material, such as cullet, and water is supplied to the top of the vessel 12. The batch 20 may also include intermixed recycled organically-coated glass fiber scrap 21. The glass fiber scrap may be supplied either separately or intermixed with the cullet or may be supplied intermittently to control the relative proportions of cullet and coated glass fiber scrap. The heat-softenable mineral material is heated by the electrodes 14. Impeller 16 disperses batch 20 in molten mineral mass 18. Air, steam and other gases are released as a result of melting the batch 20 while stirring with the impeller 16.

Large gas bubbles are generally confined to region "A" adjacent the impeller since large bubbles tend to rise in the molten mineral mass 18. The large bubbles can be sheared into many smaller bubbles. The lower region "B" of the vessel 12 houses the electrodes 14 which may be formed of molybdenum, platinum or other suitable materials. If molybdenum electrodes are used it is important that they be isolated from any steam or corrosive gases in the molten mineral mass 18 since steam or corrosive gases may react with the electrodes causing corrosion. Small seeds 23 remain in the molten mineral mass in the lower portion of the vessel B.

The molten mineral mass 18 includes many small seeds and gaseous occlusions as it is fed through the outlet port 24. Molten mineral received from the vessel 12 though the outlet port 24 is supplied to a fiber forming process. As shown, molten mineral material may be supplied either directly to a spinner 30 or via a channel which may feed multiple spinners to form fibers 32 as the molten mineral mass is centrifuged through orifices 34 in the spinner 30. Other fiberizing techniques may be used with the occluded glass melt of this invention. Fibers 32 are deposited in a chute 36. Binder spray nozzles 38 are preferably provided on the chute 34 which coats the fibers with an organic binder coating which causes the fibers 32 to form a mat. The fibers 32 are then collected on a conveyor 40 and further processed by conventional techniques.

The impeller 16 is preferably formed from steel and includes a water cooling conduit 42 which extends down the shaft 44 and into the blades 46 of the impeller. The water cooling conduit 42 receives cooling water causing the impeller 16 to be maintained at a cooler temperature than the molten mineral mass 18. The cool temperature of the impeller causes a portion of molten mineral mass 18 to freeze on the surface of the impeller. This coating of frozen molten mineral mass 18 protects the impeller from wear and insulates the impeller from the Joule heating circuit provided by the electrodes 14.

Figure 2:
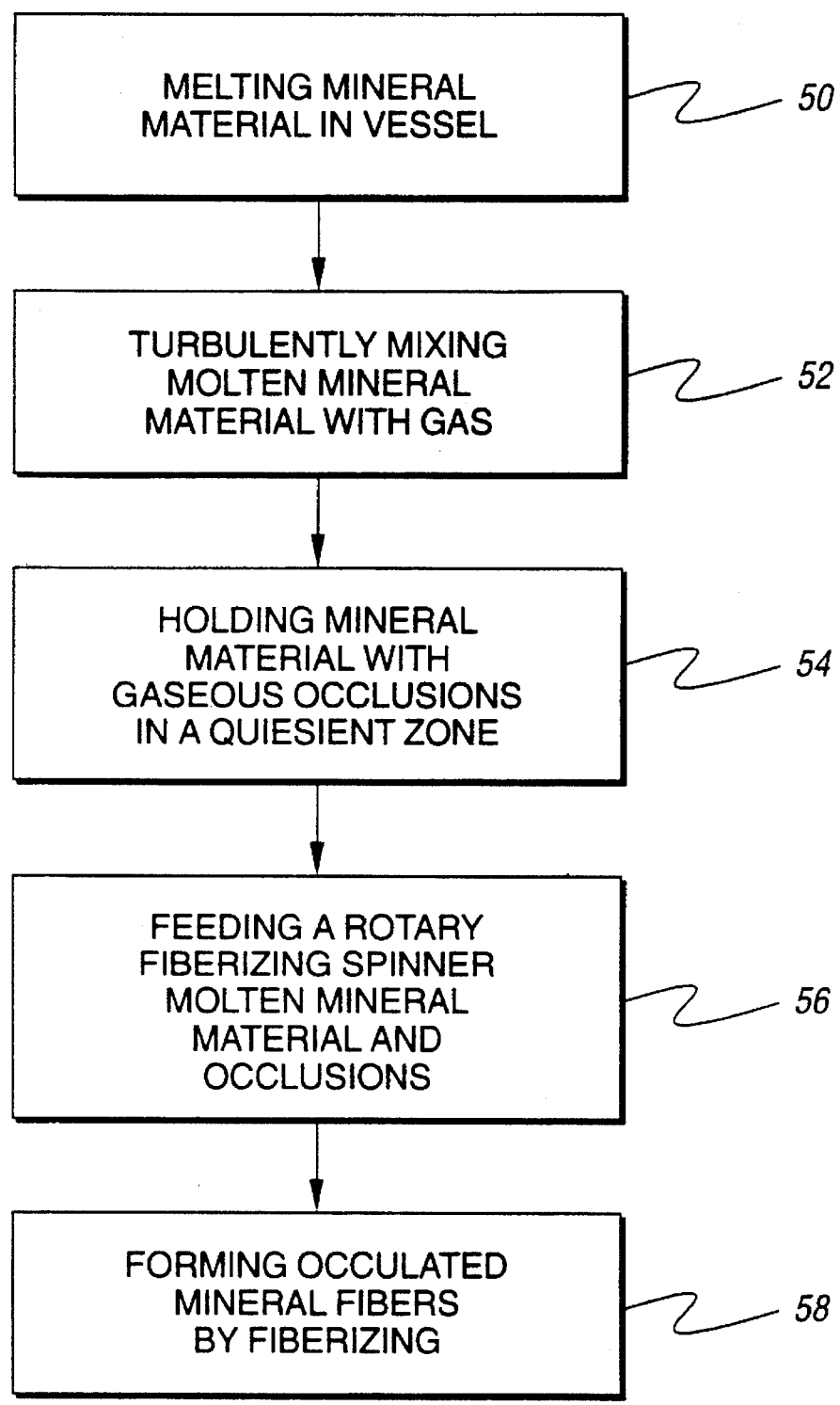
FIG. 2 is a flow chart showing the steps whereby mineral material is converted into mineral fibers according to the present invention.

Referring to FIG. 2, the process of the present invention is shown in flow chart form. The first step in the process shown at 50 is melting the heat-softenable mineral material in the vessel 12. After an initial melt is formed the impeller 16 is actuated to turbulently mix the molten mineral material 18. Additional batch 20 is supplied to the vessel causing dispersion of batch 20 in the vessel 12 and conversion of any water in the batch 20 to steam and other impurities to gas and seeds.

The turbulent mixing of the glass bath with the impeller results in the formation of a melted glass having gaseous occlusions of up to 50% by volume of the glass bath. This occluded melted glass is supplied through a settling cone or device to the rotary spinner 30 to form glass fibers having gaseous occlusions of between 1% and 10% by volume.

The molten mineral mass 18 is held in the vessel and allowed to pass into a relatively quiescent zone "B" in the lower portion of the vessel where larger seeds and gas bubbles rise as represented by reference numeral 54. The molten mineral material is then sent to a rotary fiberizing spinner even though it includes many minuscule gaseous occlusions and seeds.

Referring now to step 58, the rotary fiberizing spinner forms hollow mineral fibers 60 as a result of the centrifuging of the molten mineral material including gaseous occlusions and small seeds through the rotary fiberizing spinner.

Referring now to FIG. 3, an alternative embodiment of the present invention is illustrated schematically, wherein several spinners 60a, 60b and 60c are used to form mineral fibers 62. Each spinner 60a–60c receives molten mineral material from the melter 64 through a channel 66.

The melter 64 has an impeller 68 which mixes batch 70 into the molten mineral material 72 contained in vessel 74. The vessel 74 is heated by Joule heating by the electrodes 76.

Each spinner 60a–60c forms the fibers 62 as previously described.

The above description of a preferred embodiment of the invention is intended by way of illustration and should not be used to limit the scope of the claims. The broad scope of the invention should be construed by reference to the following claims.

What is claimed is:

1. A method for making mineral fibers of heat-softenable mineral material comprising:

melting the heat-softenable mineral material in a vessel;

stirring the heat-softenable mineral material during said melting step to form a molten mineral mass having gaseous occlusions;

feeding additional heat-softenable mineral material on top of the molten mineral mass inside the vessel;

removing from the vessel a portion of the molten mineral mass having gaseous occlusions of up to 50% by volume; and fiberizing the molten mineral material after said removal step to provide mineral fibers having gaseous occlusions of greater than 1% by volume.

2. The method for making mineral fibers of claim 1 wherein said fiberizing step is performed in a rotary fiberizing spinner.

3. The method for making mineral fibers of claim 1 wherein an impeller performs said stirring step and has a drive shaft which is disposed within the molten mineral mass.

4. The method for making mineral fibers of claim 3 wherein water is utilized to cool the impeller.

5. The method for making mineral fibers of claim 4 wherein the water cools blades of the impeller.

6. The method for making mineral fibers of claim 1 wherein gas is injected into the molten mineral mass.

7. The method for making mineral fibers of claim 1 wherein the mineral fibers are made with gaseous occlusions of less than 10% by volume.

8. A method for making mineral fibers of heat-softenable mineral material comprising:

melting the heat-softenable mineral material in a vessel;

stirring the heat-softenable mineral material during said melting step to form a molten mineral mass having gaseous occlusions;

feeding additional heat-softenable mineral material on top of the molten mineral mass inside the vessel;

removing from the vessel a portion of the molten mineral mass having the gaseous occlusions of up to 50% by volume; and supplying the molten mineral material after said removal step to a rotary fiberizing spinner to provide mineral fibers having gaseous occlusions of 1–10% by volume.

* * * * *